United States Patent [19]
Palay et al.

[11] Patent Number: 5,613,120
[45] Date of Patent: Mar. 18, 1997

[54] SYSTEM AND METHOD FOR ENABLING, WITHOUT RECOMPILATION, MODIFICATION OF CLASS DEFINITIONS AND IMPLEMENTATIONS IN AN OBJECT-ORIENTED COMPUTER PROGRAM

[75] Inventors: Andrew J. Palay, Mountain View; Shankar Unni, Campbell; Michey N. Mehta, San Jose, all of Calif.

[73] Assignee: Silicon Graphics, Inc., Mountain View, Calif.

[21] Appl. No.: 325,155

[22] Filed: Oct. 20, 1994

[51] Int. Cl.$^6$ .................................................. G06F 9/45
[52] U.S. Cl. ............................ 395/710; 364/DIG. 1; 364/280.4
[58] Field of Search ............................................. 395/700

[56] References Cited

U.S. PATENT DOCUMENTS

| | | | |
|---|---|---|---|
| 5,257,371 | 10/1993 | Anezaki | 395/650 |
| 5,339,438 | 8/1994 | Conner et al. | 395/700 |
| 5,410,705 | 4/1995 | Jones et al. | 395/700 |
| 5,418,964 | 5/1995 | Conner et al. | 395/700 |
| 5,437,025 | 7/1995 | Bale et al. | 395/600 |

OTHER PUBLICATIONS

Palay, Andrew J., "C++ in a Changing Environment", *Usenix Association: C++ Technical Conference*, pp. 195–206.

Goldstein, Theodore C. and Alan D. Sloane, "The Object Binary Interface—C++ Objects for Evolvable Shared Class Libraries", *Sun Microsystems Laboratories, Inc.*, Jun. 1994, pp. 191–217.

"OS/2 2.0 Technical Library: System Object Model Guide and Reference", *IBM Programming Family*, Dec. 1991.

*Primary Examiner*—Kevin A. Kriess
*Assistant Examiner*—Kakali Chaki
*Attorney, Agent, or Firm*—Sterne, Kessler, Goldstein & Fox P.L.L.C.

[57] ABSTRACT

A system and method for compiling and linking a source file is described. A compiler generates class information pertaining to object-oriented classes referenced in the source file. The class information is sufficient to enable a linker to resolve class definitions and to perform class relocation operations. The compiler also generates an object file from the source file. The object file includes the class information. The compiler generates the object file such that resolution of class definitions and performance of class relocation operations are delayed until operation of the linker. A linker links the object file potentially with at least one other object file or shared library to thereby generate an executable file or shared library. The linker uses the class information contained in the object file to resolve class definitions and to perform class relocation operations.

23 Claims, 6 Drawing Sheets

SYSTEM AND METHOD FOR ENABLING, WITHOUT RECOMPILATION, MODIFICATION OF CLASS DEFINITIONS AND IMPLEMENTATIONS IN AN OBJECT-ORIENTED COMPUTER PROGRAM

BACKGROUND OF THE INVENTION

1. Field of the Invention

The present invention relates generally to software compilers and linkers, and more particularly to software compilers and linkers for compiling object-oriented computer programs.

2. Related Art

For object-oriented computer systems to be ultimately successful, software developers must be able to make compatible modifications to class definitions and implementations without requiring consumers of that class to recompile their code. The separation of interface and implementation allowed by object-oriented programming languages makes it theoretically possible to do just that. Unfortunately, when confronted with the need to provide reasonable performance, most object-oriented system developers do not strictly adhere to the separation between class interface and implementation. In the resulting object-oriented systems, the barrier between class interface and implementation is broken down, such that class implementation details are exposed to consumers.

In object-oriented systems where class implementation details are exposed to consumers, it is not possible to support modifications to shared libraries without obsoleting consumers of these libraries. Furthermore, costly recompilations are needed whenever a class definition is changed. This is especially true of conventional C++ environments. C++ is a well known object-oriented computer programming language. For illustrative purposes, the following discussion focuses on C++ systems, although the underlying concepts and principles apply to other object-oriented systems.

C++ computer systems expose the implementation of classes to consumers of the classes by resolving class layout and function binding at compile time. The effect of doing compile-time class layout is magnified by exposing the data-members of a class, either directly or through the use of inline member functions which access data members. While this violates the tenets of pure object-oriented programming practice, accessing data members directly is essential in achieving satisfactory performance in many applications.

The problems associated with conventional object-oriented computer systems, and in particular C++ computer systems, are further discussed below.

SEPARATION OF CLASS INTERFACE AND IMPLEMENTATION

Shared libraries have become an essential requirement for the development of large software systems. There are various reasons for this:

1. Shared libraries can reduce the memory requirements for running a suite of applications which use the same library, since only one copy of the library is needed in memory.

2. Shared libraries can reduce the disk requirements of a system by having only one disk copy of code shared by multiple applications.

3. A shared library provider can make quality and performance improvements in a library and replace an earlier version of the library; this automatically provides benefits to existing clients of the shared library without the need to recompile or relink.

4. A shared library provider can add new functionality to a library; existing clients will continue to work, and new clients can take advantage of the added functionality.

In order to take advantage of shared libraries, it must be possible to release a new version of a shared library, where the developer has modified the implementation (and perhaps the interface) in a compatible fashion, and have applications that use that shared library continue to work without recompilation. To achieve this, it is essential that there be an absolute separation between interface and implementation. If that separation does not exist then a change to the implementation provided in a shared library will require existing applications to be recompiled.

SHARED LIBRARY RENAMING

One common solution to the problem of shared library evolution is to bind applications against specific instances of a shared library. When a developer releases a new version of a shared library that is not link-time compatible with the previous version, the library gets released with a new name; the old version of the shared library will continue to exist. Applications that used the old version will continue to work by linking against the old version, while new applications can link against the new version. This solution does allow new clients to take advantage of added library functionality; however, this solution does not enable the memory and disk space savings that shared libraries should deliver, and existing clients cannot take advantage of any quality and performance improvements in the new library.

If application A requires version 1 of a shared library and application B needs version 2 of the shared library, then when both applications are running, there will be two copies of the shared library in memory at the same time. Similarly, because both libraries are needed, they must both be resident on the machine's disk. In fact, using this scheme users must install all versions of a shared library ever released, since they will not know which versions are needed to run the applications they are interested in.

From a library providers' perspective, this mechanism poses many difficulties. Not only does a library provider have to continue to ship out all versions of a library, but they may be left with the near impossible task of fixing problems in older versions of the shared library. Assume in the previous example that users of application A find a problem in version 1 of the shared library that is fixed in version 2 of the library. Since the two versions are not link-compatible the library provider cannot force existing applications to use version 2 of the library. Either the application provider must release a new version of their application (a cost they may not want to assume, since the problem is not in their code) or the library provider must provide an new version of the library that is link-compatible with version 1. This may or may not be possible to do, but assuming that it is, going back and fixing older versions of a system is often extremely expensive and difficult.

Another drawback with this mechanism for supporting shared libraries is with applications that are designed to dynamically load shared libraries, specifically ones that are provided by other vendors. Many systems are being built in this fashion, where a basic object-oriented framework is provided, and multiple vendors provide extension components that are loaded on demand. For these systems to work, the framework provider must be able to release new versions of the framework and have existing extension libraries continue to work. This can only be done if the new framework library is link-compatible with the old library.

REDUCING BUILD TIMES

Separation of class interface and implementation also provides benefits during software development. With a complete separation, code that uses an interface need not be recompiled when the underlying implementation has changed or when the interface changes in a compatible fashion. With a complete separation, the cost of introducing a modified interface/implementation would be limited to the cost of re-compiling the new implementation and relinking. Without a complete separation, it is usually necessary to recompile all code that uses the interface, and this means unacceptably long build times. The effect of not providing a complete separation is that developers stop modifying code in heavily used portions of the system. Developers are thus discouraged from making changes in the kernel of a system, leading to ad-hoc workarounds in other parts of the system. This leads to systems that are difficult to understand and maintain.

THE PROBLEMS WITH EXISTING C++ COMPILATION SYSTEMS

A fundamental problem with conventional C++ compilation systems is that they resolve class interfaces and implementation at compile time and these implementation decisions are embedded in client code. This is the case, even with C++ code written in a pure object-oriented fashion (i.e., classes that only provide virtual member functions and have only private data members). With such code, simple changes to even the private interface of a class will result in the generation of link-incompatible code. Such conventional C++ systems view this as being necessary in order to achieve acceptable performance. For example, consider the class declarations in Code Example 1 and the code in Code Example 2:

```
class alpha {
    public:
        virtual int f();
        virtual int g();
    private:
        int a;
        int b;
};
class beta : public alpha {
    public:
        virtual int i();
        virtual int j();
        virtual int k();
    private:
        int c;
        int d;
};
Code Example 1
int beta::i()
{
return c + j();
}
Code Example 2
```

Under the layout scheme used by most conventional C++ compilers, the "return" statement in Code Example 2 would access the member c by accessing the information 12 bytes off of the "this" pointer and would access the function j by looking for a pointer to the virtual table that is 8 bytes from the "this" pointer and then looking in the virtual table (typically in the fourth slot) for the function pointer. As is well known, the "this" pointer is the pointer that addresses the object being acted on.

Suppose that the provider of class alpha wants to change the implementation of alpha by adding another data member as shown in Code Example 3:

```
class alpha {
    public:
        virtual int f();
        virtual int g();
    private:
        int a;
        int b;
        int x;
};
Code Example 3
```

With this change in alpha's definition the layout for beta has also changed so the data member c is now located 16 bytes from the "this" pointer and the pointer to the virtual table is now 12 bytes from the "this" pointer. Even with this simple change (note that the interface to alpha has not changed), a call to beta::j (Code Example 2) cannot work without being recompiled.

A possible solution to this problem is to add one level of indirection to the layout of objects and use indirection when accessing data members. Under this scheme, a pointer to an instance of class beta would be pointing to a three word structure, the first word being a pointer to the virtual table, the second word being a pointer to the data members provided by alpha, and the third word being a pointer to the data members provided by beta. The cost of this layout scheme is an added memory reference whenever accessing data members of a class and an extra word per depth of the class hierarchy for each class instance. An instance of a class that derives from beta would have a three word overhead.

Consider a simple change to the interface of class alpha (shown in Code Example 4), where a new virtual member function is added.

```
class alpha {
    public:
        virtual int f();
        virtual int g();
        virtual int m();
    private:
        int a;
        int b;
        int x;
};
Code Example 4
```

Now the slot for the member function j in the virtual table for beta moves from four to five. This would require that the call to beta::j be recompiled. Again, this problem could be solved by adding a second level of indirection to the virtual table. Thus, the virtual table pointer associated with an instance of class beta will actually point to a two word table. The first word would point to a table for the virtual functions introduced by alpha and the second word would point to the virtual member functions introduced by beta. This would introduce one extra memory reference whenever a virtual member function is accessed.

A similar solution would be to introduce a second virtual table pointer in each instance of a beta. In this case a pointer to an instance of class beta would be pointing to a four word structure, comprising: (1) the virtual table pointer for the virtual member functions provided by alpha, (2) the pointer to alpha's data members, (3) the virtual table pointer for the virtual member functions provided by beta, and (4) the pointer to beta's data members. This would remove the extra memory reference when accessing a virtual member function but increases the memory overhead per instance to twice the depth of the class in a class hierarchy.

The solutions considered above fail as more elaborate changes are introduced to the class interfaces. Ideally, it should be possible to make these changes without forcing recompilation of code that uses the interface, but this is not the case with the above solutions.

For example, consider a relatively simple change to a pair of class interfaces where a member from a derived class is promoted to a base class (such as moving the virtual member function k from beta to alpha). From the point of view of a consumer of alpha and/or beta, neither class interface has changed in an incompatible fashion. Consumers of alpha see an expanded interface, and consumers of beta see exactly the same interface. What changes is the layout of the virtual function table for alpha and beta in the normal layout mechanism used by most conventional C++ compilers. In most C++ systems the slot for the virtual function beta::j changes to six.

None of the proposed solutions for handling simple changes to virtual member functions can correctly handle this type of change. In either of these schemes, the class in which a member is defined is fixed at compile time. Changing this defining class invalidates the generated code.

The ability to promote members must be supported for both data members and member functions. C++ allows data members to be part of the non-private interface of a class, either explicitly, by declaring them public or protected, or implicitly, by using them in a non-private inline member function.

Changing the overriding behavior for a class member is another type of change that requires the recompilation of consumers of a class. Consider the class definition in Code Example 5:

```
class gamma : public beta {
public:
    virtual int p();
    virtual int q();
};
Code Example 5
```

If the class definition of beta is changed so that it overrides the member function f, the virtual table associated with gamma must now, for proper operation, refer to beta::f as opposed to alpha::f. This would not be the case unless the code that contains the definition of gamma's virtual table is recompiled.

Similarly, if the original definition of the class alpha had included a non-virtual member function nv() and there was a call to that function from a pointer to a gamma (pg—>nv()), then changing beta to provide the definition of nv will require recompiling the function call in order to achieve the proper behavior. With the original code, a direct reference would be made to the function alpha::nv, while in the modified code a reference to beta::nv would be needed.

Thus, what is required is an improved system and method for enabling, without the need for recompilation, the modification of class definitions and implementations in an object-oriented computing environment.

SUMMARY OF THE INVENTION

Briefly stated, the present invention is directed to a system and method for compiling and linking a source file. In accordance with the present invention, a compiler generates class information pertaining to object-oriented classes referenced or defined in the source file. The class information is sufficient to enable a linker to resolve class definitions and to perform class relocation operations.

The class information is included in the object file generated by the compiler. The compiler generates the object file such that resolution of class definitions and performance of class relocation operations are delayed until operation of the linker.

A linker links the object file with other object files and shared libraries to thereby generate either an executable file or a shared library. The list of other object files and shared libraries may be empty, in which case the linker generates the executable file or shared library from the single object file. The linker uses the class information contained in the object file to resolve class definitions and to perform class relocation operations.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

1. Overview of the Invention

The present invention is directed to a system and method for enabling, without the need for recompilation, the modification of class definitions and implementations in an object-oriented computing environment. In accordance with the present invention, certain compatible modifications may be made to the interface and implementation of classes without requiring consumers of those classes to recompile their code. What constitutes a "compatible modification" is discussed below.

More particularly, the present invention is an improved object-oriented compilation and linking system that provides a better separation of class interface and implementation without imposing a performance penalty, and without limiting the use of the computer programming language being used. The present invention provides this separation by resolving class layout and function binding at link-time. The compiler of the present invention generates code somewhat similar to conventional compilers, but lets the linker of the present invention perform the final relocations in the code to reflect the actual class implementation. The linker performs class layout and relocations by utilizing a new set of tables generated by the compiler.

With the compiler and linker of the present invention, a developer can make upwardly compatible changes to a class definition without affecting consumers of that class. A new interface and implementation of a class can be introduced and code compiled using the old interface need only be relinked, either statically or dynamically. This enables support of upward compatible changes to shared libraries because any applications which use such shared libraries are automatically relinked by the runtime linker. The development environment is also improved by reducing the number of recompilations that need to be performed when a class interface changes; only the implementation of the class needs to be recompiled, and consumers need not be recompiled.

For example purposes, the present invention is sometimes described herein in terms of C++, which is a well known object-oriented computer programming language. However, it should be understood that the present invention is equally applicable to object-oriented systems which employ other (or additional) object-oriented computer programming languages. Furthermore, the present invention is applicable to non-object-oriented systems. For example, when operating with a well known language such as C, developers often want to extend a structure. In doing so, the size of the structure changes and, depending on where the member was been added, the offset to other members might change as well. The approached of the present invention described below can be used to solve this problem.

Figure 1:
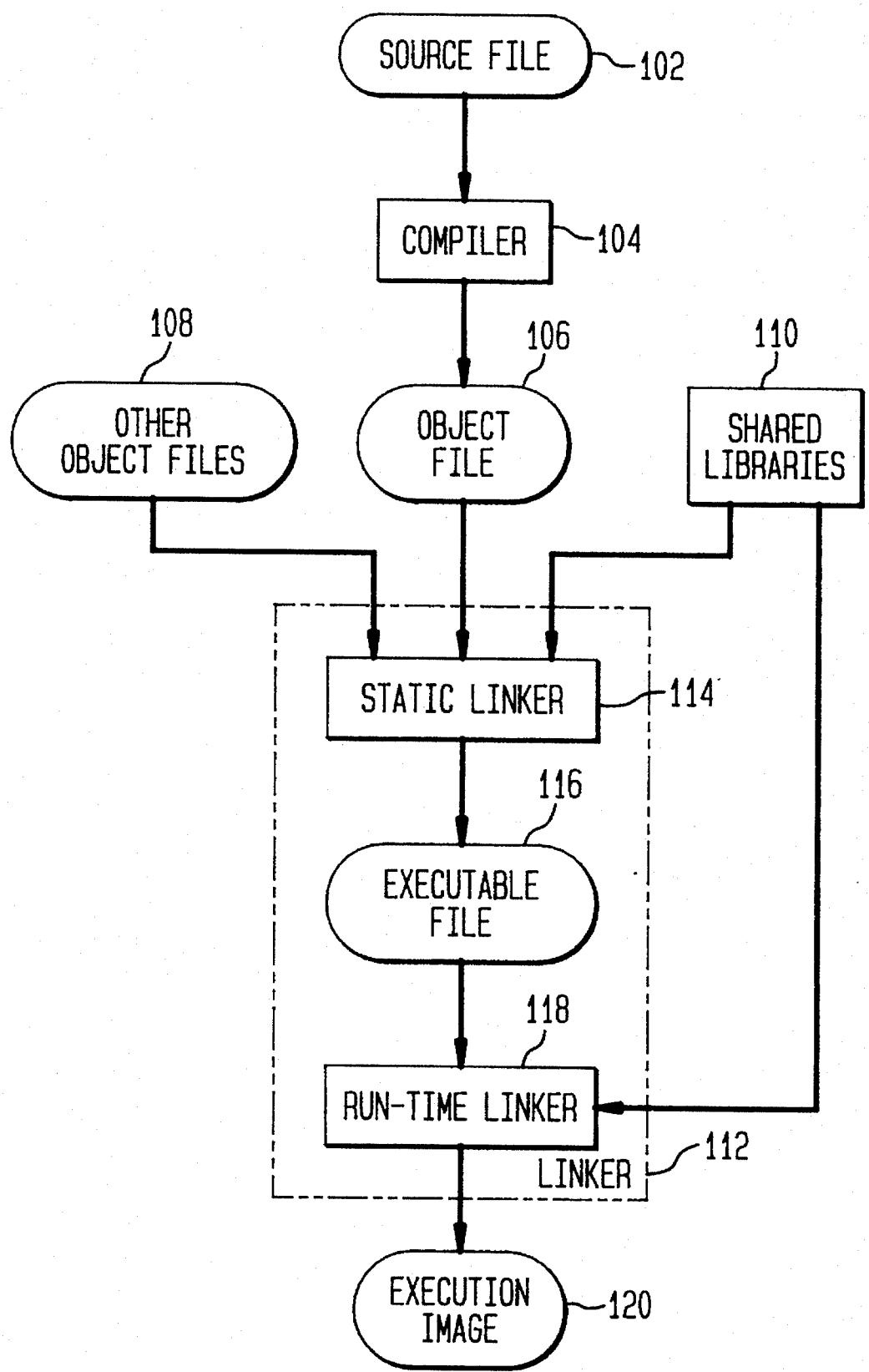
FIG. 1 is a compilation data flow diagram according to a preferred embodiment of the present invention.

FIG. 1 illustrates a compiler 104 and a linker 112 of the present invention. The compiler 104 generates an object file 106 from a source file 102. The source file 102 is preferably written in the well known C++ computer programming language. It is important to note that the present invention does not impose restrictions on how developers may use the C++ language to produce the source file 102. This is in contrast to conventional approaches for solving the problem addressed by the present invention. Such conventional approaches impose limits and restrictions on the use of the computer programming language being used.

The object file 106, as well as zero or more other object files 108 and/or zero or more shared libraries 110 are transferred to a static linker 114, which is part of the linker 112. The other object files 108 were previously compiled by the compiler 104 of the present invention and the shared libraries 110 were previously created by the static linker 114. The static linker 114 generates an executable file 116. Alternatively, the static linker 114 generates another shared library. As will be appreciated, a shared library is a form of an object file. Accordingly, the terms "object file" and "shared library" will be used interchangeably herein. As will be appreciated by persons skilled in the relevant art, the executable file 116 includes code, data, and other information from the object files 106, 108, and also contains references to the shared libraries 110 (i.e., code, data, etc., from the shared libraries 110 are not actually embedded in the executable file 204).

During run-time, the executable file 116 and the shared libraries 110 are transferred to a run-time linker 118, which is also part of the linker 112. The run-time linker 118 resolves references contained in the executable file 116 to the shared libraries 110, and produces an execution image 120. The execution image 120 is stored in main memory 208 and executed by a central processing unit 204 (FIG. 2).

Generally speaking, the operation of the static linker 114 and run-time linker 118 may be broken down into four phases. Referring to a flowchart 302 shown in FIG. 3, the static linker 114 and run-time linker 118 each perform a read phase 306, a layout phase 308, a relocation phase 310, and a write phase 312. These linker phases 306, 308, 310, and 312 are well known to persons skilled in the relevant art, and are described in many publicly available documents, such as Andrew Tanenbaum, *Structured Computer Organization,* Prentice Hall, 1976, which is herein incorporated by reference in its entirety. In the present invention, these linker phases 306, 308, 310, and 312 have been modified such that the linker 112 resolves class definitions and performs the relevant class relocations. Such modifications are described in detail below.

Figure 2:
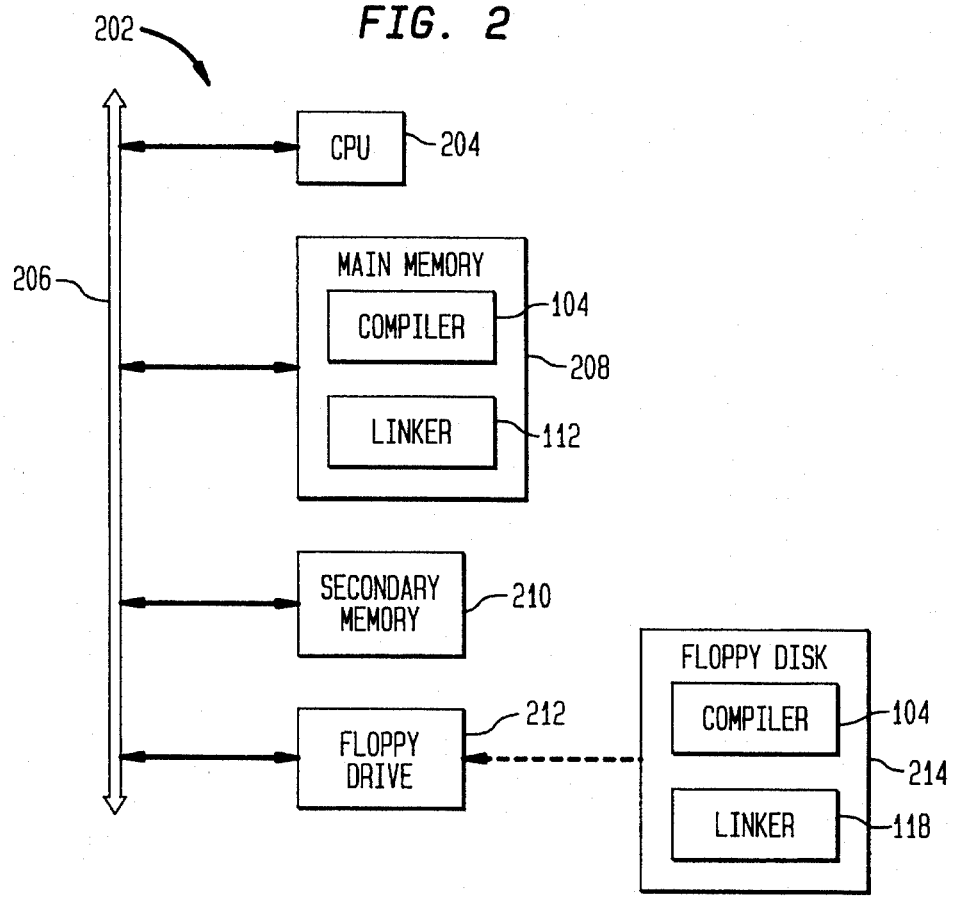
FIG. 2 is a block diagram of a computer system according to a preferred embodiment of the present invention.

FIG. 2 is a block diagram of a computer system 202 according to a preferred embodiment of the present invention. The computer system 202 includes one or more processors, such as central processing unit (CPU) 204, connected to a communication medium, such as bus 206. A main memory (i.e., random access memory, RAM) 208 is also connected to the bus 206. The compiler 104 and linker 112 are stored in the main memory 208. The source file 102, object files 106, 108, shared libraries 110, and execution image 120 are also preferably stored in the main memory 208. The compiler 104 and linker 112 may also be stored in a secondary memory 210, such as a hard disk, a tape drive, etc.

A computer program product (such as floppy disk 214), comprising a computer readable media having computer program logic recorded thereon, wherein the computer program logic when executed in the computer system 202 enables the computer system 202 to perform the functions of the present invention, may be read by an additional storage device, such as floppy disk drive 212. The computer program logic, which represents the compiler 104 and the linker 112, may then be loaded into the main memory 208 (as shown), and executed by the CPU 204.

A suitable form for the computer system 202 is an Indigo, Indy, Onyx, Challenge, or Power Challenge computer made by Silicon Graphics, Inc., of Mountain View, Calif. Any other suitable computer system could alternatively be used.

Figure 5:
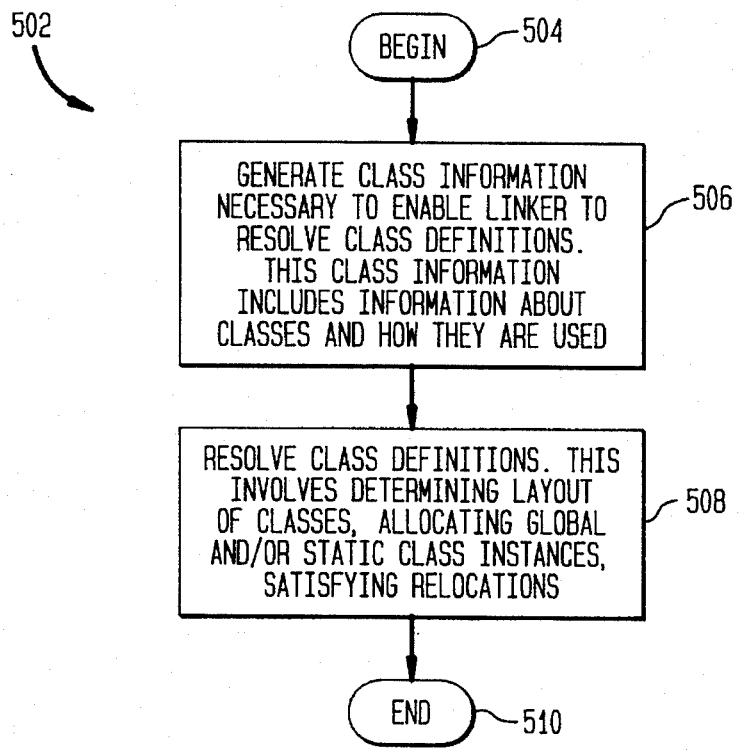
FIG. 5 is a flowchart of a compilation/linking process according to a preferred embodiment of the present invention.

FIG. 5 depicts a flowchart 502 which represents the high-level operation of the compiler 104 and the linker 112. The compiler 104 performs step 506 when compiling the source file 104, and the linker 112 performs step 508 when processing the object files 106, 108 and the shared libraries 110. Flowchart 502 begins with step 504, where control immediately passes to step 506.

Figure 4:
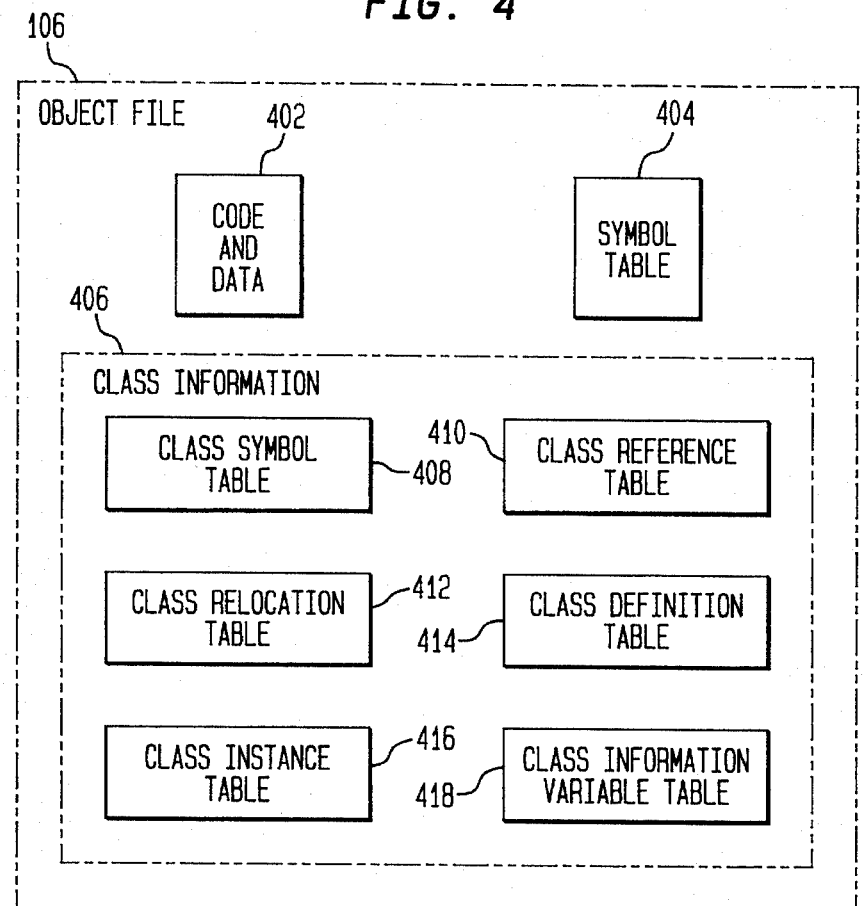
FIG. 4 is a block diagram of an object file produced by a compiler according to a preferred embodiment of the present invention.

In step 506, the compiler 104 generates an object file 106 from the source file 102. As shown in FIG. 4, the object file 106 includes code and data 402, and a symbol table 404. The manner in which the compiler 104 generates such code and data 402, and the symbol table 404, will be apparent to persons skilled in the relevant art.

In accordance with the present invention, the compiler 104 does not resolve class definitions, allocate class instances, or perform relocations. Instead, the compiler 104 generates class information 406, and embeds such class information 406 in the object file 106. Such class information 406 includes information about classes defined and/or referenced in the source file 102, and includes additional information on how such classes are used by the source file 102. The class information 406 generated by the compiler 104 is sufficient to enable the linker 112 to resolve class definitions, allocate class instances, and perform relocations. The class information 406 is further described below.

Figure 3:
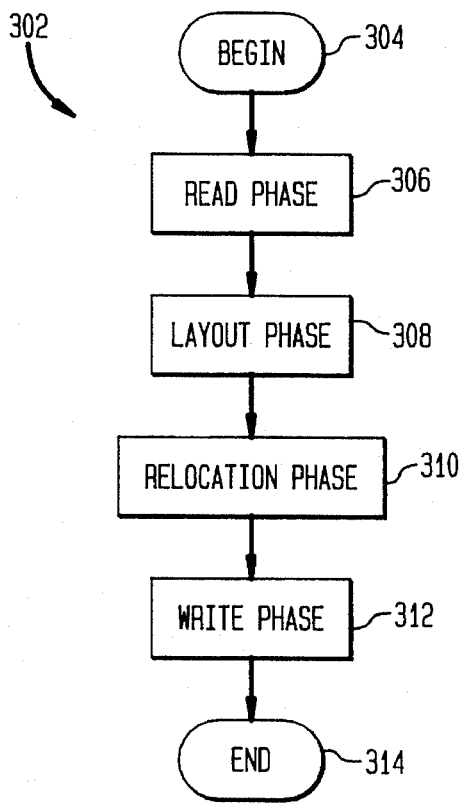
FIG. 3 is a flowchart of a linker process.

In step 508, the linker 112 generates an executable file 116, and then an execution image 120 from the object files 106 and 108 and the shared libraries 110. As discussed above, during the generation of the executable file 116 and the execution image 120, the static linker 114 and the run-time linker 118 perform a read phase 306, a layout phase 308, a relocation phase 310, and a write phase 312 (FIG. 3). According to the present invention, these linker phases 306, 308, 310, and 312 are modified such that the static linker 114 and the run-time linker 118 resolve class definitions, allocate class instances, and perform relocations. The operation of the static linker 114 and the run-time linker 118 is further discussed below.

After step 508 is fully performed, the operation of flowchart 502 is complete, as indicated by step 510.

2. Compatible Changes

The present invention solves many of the problems that exist in current C++ compilers. In the present invention, the actual binding of class definitions are delayed until link-time. As a result, software developers can make substantive, compatible changes to class definitions and class hierarchies, while only recompiling the files that implement classes (i.e., implement any of the methods of such classes) that have been directly changed.

What constitutes "compatible changes" is implementation dependent, and depends on such factors as the computer programming language being used to generate the source programs, and the characteristics of the target machine on which the compiled and linked programs are to execute.

Also, in practice, a reasonable balance must be made between the ability to change class definitions and the need to generate efficient code. In most systems, it would not be advantageous to sacrifice substantial speed in order to allow developers complete freedom to make arbitrary changes to class definitions.

One example of this is the handling of inline member functions. Developers often use inline member functions as accessor functions for private data members. This allows them to write code that has only a functional interface but compiles down to direct references to an object's data members. In order to allow developers to change the definition of an inline member function it would be necessary to ignore the inline attribute and generate out-of-line copies. Thus, while it is appealing to allow developers the freedom to change the definition of an inline member function, to do so would require such functions to be called out-of-line, and this would negate the reason for using inlines in the first place.

Examples of compatible changes for a typical implementation are listed below:

Member Extension (the addition of new members to a class)

Member Promotion (promoting a member from a derived class to a base class)

Override Changing (overriding a member from a base class)

Class Extension (adding new base classes to a class)

Member Reordering (reordering the members of a class)

These compatible changes are based on the C++ computer language, but are applicable to other computer languages. Compatible changes for particular computer languages will be apparent to persons skilled in the relevant art based on the discussion contained herein.

The compatible changes listed above are discussed in the following sections. It should be noted that various performance-based restrictions may apply to these compatible changes (some example restrictions are discussed below). The actual restrictions are implementation dependent, and depend on the performance which one wants to achieve.

2.1 Member Extension

Member extension is the addition of any new member to a class definition. For example, moving from the definition of alpha in Code Example 1 to Code Example 4 is an example of member extension where both a data member and a virtual member function have been added. In accordance with the present invention, from the perspective of a consumer of alpha, any code that previously referenced a member of alpha will still be valid. Without the ability to extend a class definition (which includes just adding private data members), even fixing minor bugs in C++ libraries becomes impossible without breaking link-time compatibility.

2.2 Member Promotion

Member promotion is moving a member from a derived class to a base class. For example, given the definition of alpha and beta in Code Example 1, the following is an example of member promotion:

```
class alpha {
    public:
        virtual int f();
        virtual int g();
        virtual int j();
    private:
        int a;
        int b;
};
class beta : public alpha {
    public:
        virtual int i();
        virtual int k();
    private:
        int c;
        int d;
};
Code Example 6
```

From the point of view of a consumer of the class beta, its interface has not changed. Any references to the method beta::j are still valid. The offset in the vtable (virtual table) for this method will be different as will the function address stored in the vtable, but these are handled transparently by the linker 112.

2.3 Override Changing

Supporting override changing makes it possible for a developer to override a member that was originally found in a base class. Typically, only member functions are ever overridden, but the present invention also allows the overriding of data members. By allowing changes to the override behavior of a class, a developer can, in a subsequent release, specialize the actions of the derived class.

An example of override changing is given in Code Examples 7 and 8, which are derived from Code Example 6. In this case, the class member f() has been overridden in the class beta.

```
class alpha {
    public:
        virtual int f();
        virtual int g();
        virtual int j();
    private:
        int a;
        int b;
};
class beta : public alpha {
    public:
        virtual int i();
        virtual int k();
        int f();
```

```
        private:
            int c;
            int d;
    };
    Code Examples 7 and 8
```

With this definition of beta, the following code:

```
    beta *pb;
    pb->beta::f();
    Code Example 9
``` will now call the function beta::f() instead of calling alpha::f(), which would have been called using the definition of beta in Code Example 6.

2.4 Class Extension

Class Extension is the ability to add new base classes to an existing class. In an embodiment of the present invention, new base classes may be added provided the following two guidelines are satisfied:

1. If a class has no base classes or a single non-virtual base class, then a developer can split the class into two classes, one of which derives from the other.
2. If a class has more than one non-virtual base class or any virtual base classes then any number of non-virtual base classes can be added, as long as no base classes are added to the class hierarchy above the class being changed. New base classes must be added to the end of the list of already existing base classes.

Completely general class extension would allow the developer to add an arbitrary number of new base classes to an existing class definition. Supporting general class extension might result in a substantial performance penalty during the construction and destruction of class instances. The largest performance penalty would be the need to prepare for the initialization of an arbitrary set of virtual base classes. The exact set of virtual base classes would not be known until link time. A performance degradation would also be encountered in the setting of virtual table pointers: with general class extension, the exact number of virtual table pointers would not be known until link-time.

Accordingly, for performance purposes, the above restrictions are preferably employed. Such performance advantages are achieved since most use of C++ is limited to single inheritance. For example, the class definition in Code Example 10 can be changed as shown in Code Example 11.

```
    class alpha {
        ....
    };
    class gamma : public alpha {
        ....
    };
    Code Example 10
    class alpha {
        ....
    };
    //gamma has been split into beta and gamma
    class beta : public alpha {
        ....
    };
    class gamma : public beta {
        ....
    };
    Code Example 11
```

2.5 Member Reordering

Member reordering allows the movement of members within a class definition. This would normally be used to repack the layout of a class instance to reduce the size of memory being allocated for each instance.

3. Class Information

As discussed above, the compiler 104 does not resolve class definitions, allocate class instances, or perform relocations. Instead, the resolution of the class definitions is delayed from compile time to link time. In step 506 of FIG. 5, the compiler 104 generates information about classes and how they are used. Such information is called class information 406, and is embedded in the object file 106 produced by the compiler 104 (FIG. 4).

The class information 406 includes:

1. a class definition table 414 containing a list of class definitions;
2. a class instance table 416 containing a list of global, static and automatic class instances;
3. a class information variable table 418 containing a list of class information variables;
4. a class symbol table 408 containing a list of class-based symbols;
5. a class relocation table 412 containing a list of class-based relocation entries; and
6. a class reference table 410 containing a list of classes.

Using the class information 406, the linker 112 in step 508 determines the exact layout of classes, allocates any global or static class instances, and then satisfies the class-based relocations. Allocation of automatic class instances are handled during the relocation phase. The class information 406 generated by the compiler 104 is further discussed in the following sections.

3.1 Class Definition Table

Preferably, in the present invention classes can either be dynamic, internal dynamic or non-dynamic. A class is dynamic if the developer specifically makes the class dynamic by using a pragma statement. Dynamic class definitions can be changed in ways specified above. The actual size and layout of a dynamic class is not known until link-time. A class is internal dynamic if it either derives from a dynamic class or if one or more of its non-static data members is an instance of a dynamic class. Internal dynamic classes are not laid out until link-time, but from the developer's perspective, the definition of an internal dynamic class cannot be changed. Non-dynamic classes are resolved at compile-time and cannot be changed.

The class definition table 414 includes an entry for each dynamic class, internal dynamic class, and non-dynamic class that is an ancestor of any dynamic class defined and/or referenced in the source file 102.

Each class definition (i.e., each entry in the class definition table 414) contains the following information:

1. header information
2. list of base classes
3. list of data members added by the class
4. list of static data members added by the class
5. list of member functions added by the class
6. list of static member functions added by the class

HEADER INFORMATION

The header information gives the name of the class and indicates whether the class is dynamic. If the class is dynamic, then it indicates whether the class is internal dynamic. If the class is non-dynamic the header information also gives the size and alignment for instances of that class. If a non-dynamic class has any virtual methods, then the header information also indicates the offset to the class' main virtual method table pointer and the aggregate size of all of the virtual method tables associated with the class. The aggregate size is the sum of the sizes of all the virtual method table exclusive of the tables associated with virtual base classes.

LIST OF BASE CLASSES

The List of Base Classes includes one entry for each of the class's direct base classes. Each entry in the List of Base Classes includes the name of the base class and an indication of whether the derivation is virtual. If the class being described is non-dynamic, the base class entry also contains the offset to the base class instance within the derived class and the offset in the aggregate virtual ruble that represents the base class virtual table.

LIST OF DATA MEMBERS

The List of Dam Members includes an entry for each data member added by the class.

There are three basic types of data members. First and most frequent is a data member that is neither a bit-field nor an instance of a dynamic class. The data member entry for a dynamic class includes the name of the data member, its size, and its alignment. For a non-dynamic class, the data member entry includes the above information, plus the actual offset to the data member within the class.

The second data member type is one having a bit-field. The data member entry for a bit-field extends the previous data member description with information specific to bit-fields. For a dynamic class having a bit-field, the size and alignment fields describe the size and alignment of the base type of the bit field. For example, consider the following bit-field declaration:

short field: 3;

In this case, the data member entry would have a size of 2 bytes and an alignment of 2 bytes (if there were no bit-fields). In the case of a bit-field, this information is extended by the size of the bit-field itself. In the above example, it would be 3 bits. For a non-dynamic class definition, the bit-field entry also contains the bit-offset of the field, relative to the offset of the entry itself.

The third data member type is a dynamic class instance. This can only occur in a dynamic class definition, since any class that contains an instance of a dynamic class must be dynamic. The data member entry that describes a dynamic class instance includes the name of the member, a reference to the class that is the type of the member, and the number of elements of that type. For a member that is a single instance of a dynamic class, the number of elements is 1. For an array of instances, the number of elements is the number of elements in the array.

In order to handle anonymous unions, the data member list also includes entries that note the beginning and end of the union. For example, the following class definition:

```
class alpha {
  int i;
  union {
    int j;
    short k;
  };
};
```
Code Example 12 would have an entry for the member i, a marker noting the beginning of the anonymous union, entries for j and k, and then a marker noting the end of the anonymous union.

LIST OF STATIC DATA MEMBERS

The List of Static Data Members has an entry for each static data member added by the class. Each entry contains the name of the static data member and a pointer to an entry in the symbol table 404 that will provide the actual address of the static data member. The information describing static data members is the same regardless of whether the class being declared is dynamic or not.

LIST OF MEMBER FUNCTIONS

The List of Member Functions contains an entry for each member function added by the class. Each entry contains the name of the member function, a pointer to an entry in the symbol table 404 that will provide the actual address of the member function, and an indication of whether it is a virtual member function. For virtual member functions in a non-dynamic class definition, this information is augmented by the position of the member within the virtual table.

LIST OF STATIC MEMBER FUNCTIONS

The List of Static Member Functions includes an entry for each static member added by the class. Each entry contains the name of the member function and a pointer to the entry in the symbol table 404 that will contain the actual address of the static member function.

3.2 Class Reference Table

The class reference table 410 includes an entry for each class that is defined and/or referenced in the source file 102. Each entry includes information that identifies the class. For example, if the source file 102 defines and/or references a class alpha, then there would be an entry in the class reference table 410 for this class. The entry would contain "alpha", or some other information that identifies the class.

3.3 Class Instance Table

The size of a dynamic class instance is not known until link time. Accordingly, the compiler 104 cannot allocate such instances. This is true for global, static and automatic instances. In order to handle these instances, a description of each instance must be provided to the linker 112. In other words, the class instance table 416 includes an entry for each of these instances.

The entries for global and static instances each includes a pointer to an entry in the symbol table 404 representing the instance, a pointer to an entry in the class reference table 410 corresponding to the appropriate class, and the number of elements that need to be allocated. For regular class instances, the number of elements to be allocated is 1. For automatic instances, the entry contains a pointer to an entry in the class reference table 410 corresponding to the appropriate class, and the number of elements that must be allocated.

Figure 8:
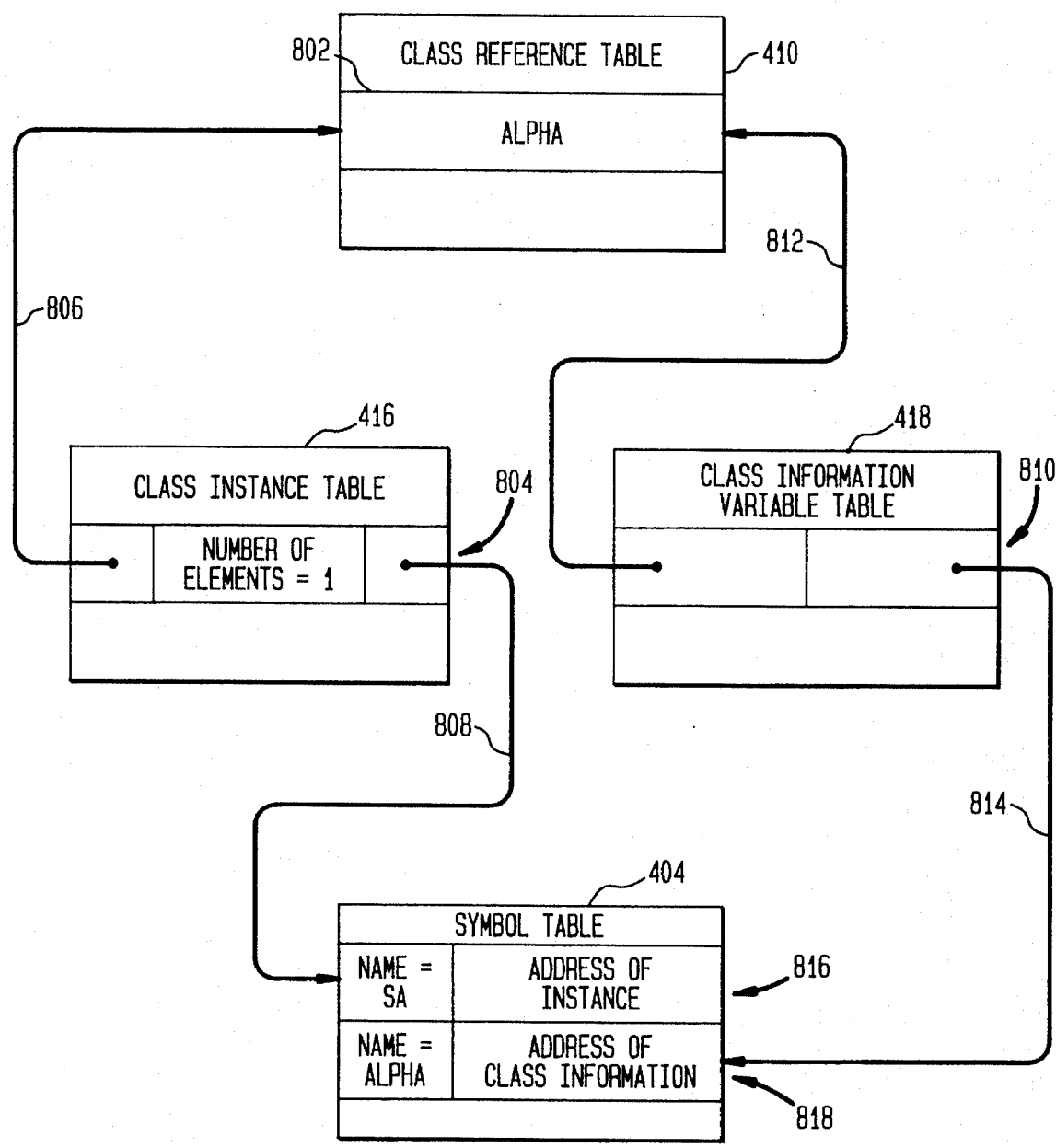

For example, suppose the source file 102 includes a statement that instantiates a global or static object of class alpha. Suppose this object is called "SA". An example class instance table 416, class reference table 410, and symbol table 404 that results from such an instantiation is shown in FIG. 8.

The class reference table 410 includes an entry 802 that corresponds to the class alpha. This entry 802 includes information (i.e., "alpha") that identifies the class alpha.

The class instance table 416 includes an entry 804 that is associated with the alpha instance SA. This entry 804 includes a pointer 806 to the entry 802 in the class reference table 410 that corresponds to class alpha. The entry 804 also contains a field that indicates that one element must be allocated.

The entry 804 includes another pointer 808 that addresses an entry 816 in the symbol table 404 that corresponds to the instance SA. This entry 816 includes the name of the instance (i.e., "SA"), and the address of the instance.

During link-time, the linker 112 processes each entry in the class instance table 416. For the entry 804 in the class instance table 416, for example, the linker 112 allocates memory for the object SA, and then stores the address of such memory in the appropriate field of the associated entry 816 in the symbol table 404.

3.4 Class Information Variable Table

The class information variable table 418 includes an entry for each class. Each entry contains a pointer to an entry in the class reference table 410 corresponding to the appropriate class, and another pointer to an entry in the symbol table 404 that represents the class information variable. The class information variable references a data structure allocated by the linker 112 that contains a virtual table and a virtual table pointer information table for the associated class.

The virtual table pointer information table contains information that is used by a runtime routine to set the virtual table pointers in a class instance to point to the proper portions of the virtual table. That runtime routine is called from the constructors, destructor, and assignment operator for any dynamic class that has either no base classes, any virtual base classes, or more than one non-virtual base class. Each entry in this table contains a virtual base class pointer offset, an instance offset, and a virtual table offset. If the virtual base class pointer offset is not equal to −1, then that value is used as an offset to use to indirectly access a virtual base class. The instance offset is used to find the location of a virtual table pointer, either from the start of the instance, if the virtual base class pointer offset is −1, or from the start of the virtual base class, if it is not. The virtual table offset gives the position in the virtual table that should be assigned to the location given by the virtual table pointer offset. This mechanism assumes that all the virtual tables associated with a class are laid out in contiguous memory.

An example class information variable table 418, class reference table 410, and symbol table 404 is shown in FIG. 8. The class information variable table 418 includes an entry 810 for a class alpha. This entry 810 includes a pointer 812 to the entry 802 in the class reference table 410 that corresponds to class alpha.

The entry 810 includes another pointer 814 that addresses an entry 818 in the symbol table 404. This entry 818 represents the class information variable for the class alpha. This entry 818 includes a field that identifies the class information variable, and a field that contains the address of a data structure allocated and assigned to the class alpha.

During link-time, the linker 112 processes each entry in the class information variable table 418. For the entry 810 in the class information variable table 418, for example, the linker 112 allocates memory for a data structure, and then stores the address of such memory in the appropriate field of the associated entry 818 in the symbol table 404. The linker 112 forms the virtual table for the class alpha, and stores this virtual table in this data structure. The virtual table pointer information table is also stored in this data structure.

3.5 Class Symbol Table

A class symbol describes information related to class definitions that in conventional compilers would have been calculated at compile time. The class symbol table 408 comprises a plurality of entries, where each entry corresponds to a class symbol for a class. These entries are used by the linker 118 during the relocation process.

Figure 7:
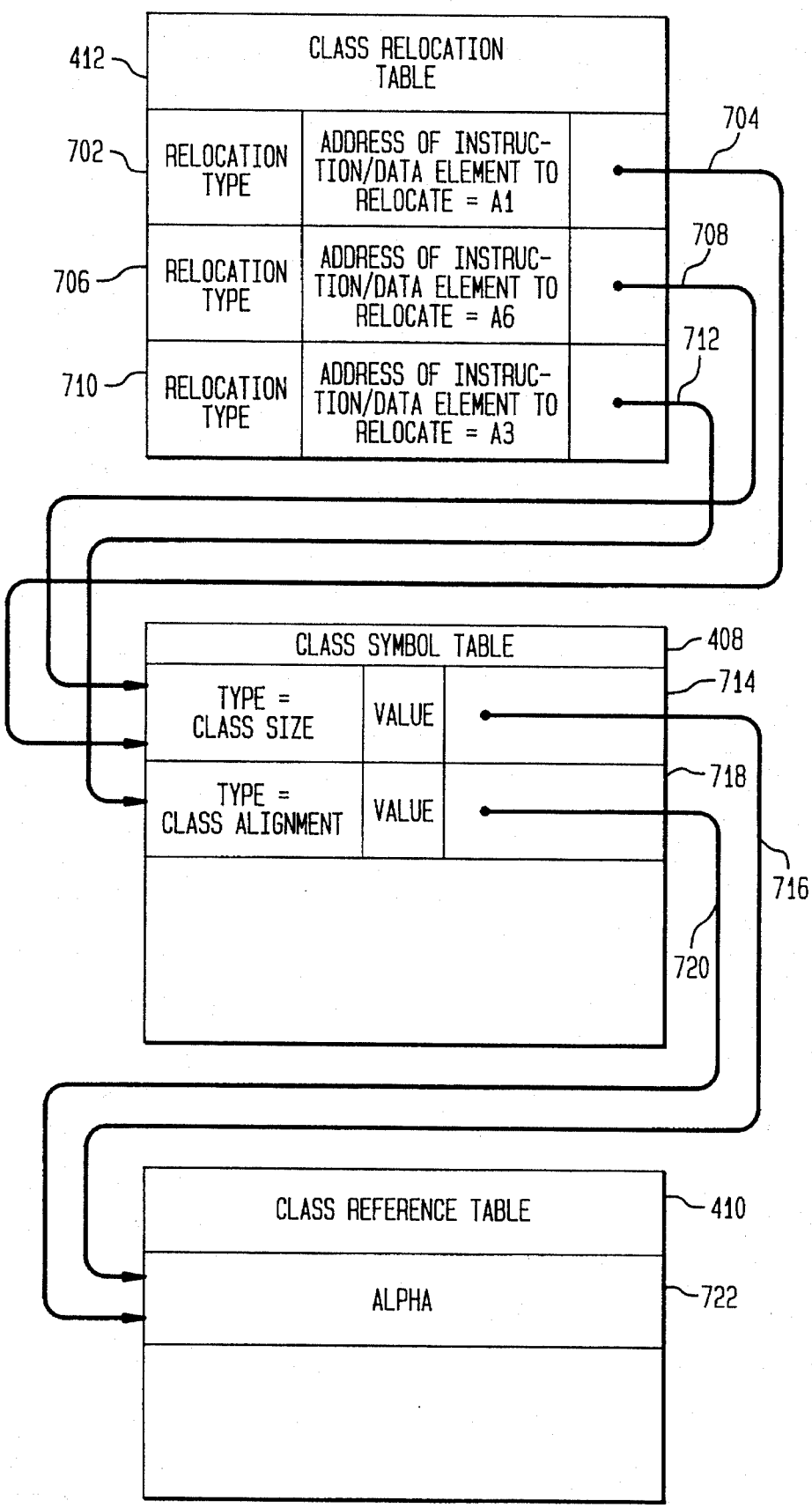
FIGS. 7 and 8 are example class information tables generated by a compiler according to a preferred embodiment of the present invention.

FIG. 7 shows two entries 714, 718 in an example class symbol table 408. Each entry in the class symbol table 408 includes a field that identifies the symbol type, a pointer (such as pointers 716 and 720) to an entry (such as entry 722) in the class reference table 410 that corresponds to a class associated with the entry, and a field that indicates the value of the symbol for this class. Entries for particular symbols may include additional fields, a symbol name and a secondary pointer to an entry in the class reference table. The symbol name when appropriate contains the name of a member, and the secondary pointer normally contains the qualified class, when such a class has been specified.

The list of symbol types is implementation specific, and depends on a number of factors, such as the computer programming language and the target machine. Example symbol types are listed below. Other symbol types will be apparent to persons skilled in the relevant art.

1. class size
2. class alignment
3. virtual table pointer offset
4. base class offset
5. virtual base class pointer offset
6. member offset
7. virtual base class pointer member offset
8. left bit-field shift
9. right bit-field shift
10. inverse bit-field shift
11. bit-field mask
12. in-place bit-field mask
13. static data member reference
14. non-virtual member function reference
15. non-virtual member function this pointer offset
16. non-virtual base class pointer member function offset
17. virtual base class pointer function offset
18. virtual member function table function offset
19. virtual member function table this offset
20. pointer-to-member-function offset
21. pointer-to-member-function index
22. pointer-to-member-function value
23. pointer-to-data-member offset
24. begin-automatic instance block
25. automatic class instance
26. end automatic instance block These symbol types are discussed in the following sections.

CLASS SIZE AND CLASS ALIGNMENT

The class size and class alignment symbol types are evaluated to the size and alignment of the reference class (that is, the class associated with the entry in the class reference table 4 10 that is addressed by the pointer in the entry of the class symbol table 408). For example, consider the following code segment.

```
class alpha {
    public:
        int a;
        int b;
        double d;
        virtual int A();
};
Code Segment 13
```

The size of the class alpha is 24 bytes (assuming 4 bytes each for the first two members, 8 bytes for the double, 4 more bytes for the virtual table pointer, and 4 more bytes of padding due to a required 8 byte alignment). The alignment is 8 bytes, for example. Now consider the following code example.

```
int i;
alpha *pa;
i = sizeof(alpha);
i = alignof(alpha);
```

-continued

```
        pa++;
        Code Example 14
```

Assume that i is stored at 40 bytes off the stack pointer and pa is stored at 44 bytes off the stack pointer. The compiler 104 would then generate the following code (or similar code):

```
li      r1,     0               /* load sizeof (alpha) */
sw      r1,     40(sp)           /* store i */
li      r1,     0               /* load alignof (alpha) */
sw      r1,     40(sp)           /* store i */
lw      r1,     44(sp)
addi    r1,     0               /* load sizeof (alpha) */
sw      r1,     44(sp)
Code Example 15
```

The "0" in the first, third, and sixth instructions of Code Example 15 represent placeholders. The linker 112 when performing the relocation procedure replaces the "0" in the first and sixth instructions with the value of the class size symbol for the class alpha. The linker 112 replaces the "0" in the third instruction with the value of the class alignment symbol for the class alpha. Prior to performing such relocation, the linker 112 determines the values of the class size symbol and the class alignment symbol for the class alpha. The operation of the linker 112 is described below.

BASE CLASS OFFSET SYMBOL AND VIRTUAL BASE CLASS POINTER OFFSET SYMBOL

The entries in the class symbol table 408 for base class offset symbols and virtual base class pointer offset symbols each include a secondary pointer to an entry in the class reference table 410 associated with the base class of the referenced class.

The value of a base class offset symbol is the number of bytes that the base class portion of the instance is located from the start of the instance. This value is typically the sum of the sizes of any non-virtual base class that appears to left of the specified base class. For the left-most base class this value is 0.

The value of the virtual base class pointer offset symbol is the number of bytes that must be added to an instance pointer in order to be pointing to the base class pointer that is needed to reference the specified virtual base class. Consider the following example:

```
class alpha {
    public:
        int a;
};
class beta {
    public:
        int b;
};
class delta {
    public:
        int d;
};
class gamma : public alpha, public beta,
        public virtual delta {
    public:
        int g;
};
Code Example 16
```

The value of the base class offset symbol for alpha in gamma is 0, the value of the base class offset symbol for beta in gamma is 4, and the value of the virtual base class pointer offset symbol for delta in gamma would be 16 (the virtual base class pointer would be located after the member g in gamma).

Using the class definition given in Code Example 16, consider the following example:

```
        gamma *pg;
        beta *pb;
        delta *pd;
        pb = pg;
        pd = pg;
        Code Example 17
```

The compiler 104 would generate the following or similar code from Code Example 17:

```
lw      r1, 40(sp)      /* load pg */
addi    r1, 0           /* add offset to get to beta portion of instance */
sw      r1, 44(sp)
lw      r1, 40(sp)
lw      r2, 0(r1)       /* load virtual base ptr for delta in gamma */
sw      r2, 48(sp)
Code Example 18
```

During relocation, the linker 112 replaces the 0 in the second instruction with the value of the base class offset symbol for the base class beta in the class gamma and replaces the 0 in the fifth instruction with the value of the virtual base class pointer offset symbol for the base class delta in the class gamma.

VIRTUAL TABLE POINTER OFFSET SYMBOL

An entry in the class symbol table 408 corresponding to a virtual table pointer offset symbol is used when calling a virtual member function. The value field in such an entry contains the offset that is needed to add to the start of the instance in order to reference the pointer to the virtual table. Thus, in Code Example 13, the value of the virtual table pointer offset symbol for the class alpha would be 16.

MEMBER OFFSET SYMBOL

An entry in the class symbol table 408 for a member offset symbol includes the name of the member being referenced and an optional secondary pointer to an entry in the class reference table 410 associated with a qualifying class. For example, consider the following Code Example:

```
class alpha {
    public:
        int a;
};
class beta : public alpha {
    public:
        int b:
};
class gamma : public beta {
    public:
        int a;
};
gamma *pg;
pg->beta::a = 10;
Code Example 19
```

The reference class is gamma, the qualifying class is beta and the member name is a. Note that the qualifying class is the class specified in the code and not the class that actually defines the member. The code for this example generated by the compiler 104 is as follows:

```
li      r1,     10
lw      r2,     40 (sp)
sw      r1,     0 (r2)          /* store into member beta::a */
Code Example 20
```

During relocation, the linker 112 replaces the 0 in the third instruction by the value of the member offset symbol for the member a, qualified by the class beta, in the class gamma.

The value of the member offset symbol depends on whether the member in question is defined in a virtual base class or not. If the member is defined in a virtual base class, then the value of the member offset symbol is the number of bytes that must be added after following the pointer to the virtual base class that defines the member. Consider the following example:

```
class alpha {
    public:
        int a1;
        int a2;
};
class beta {
    public:
        int b1;
};
class gamma : public beta, virtual public alpha {
    public:
        int g;
};
gamma *pg;
pg->a2 = 10;
Code Example 21
```

The value of the member offset symbol for the member a2 in gamma would be 4 bytes. If the member is not defined in a virtual base class then the value of the member offset symbol is the number of bytes from the start of the reference instance. If, in the previous example, alpha was a non-virtual base class of gamma, the value of the member offset symbol for a2 in gamma would be 8 bytes.

VIRTUAL BASE CLASS POINTER MEMBER OFFSET SYMBOL

An entry in the class symbol table 408 for a virtual base class pointer member offset symbol includes the name of a member and optionally a secondary pointer to an entry in the class reference table 410 associated with a qualifying class. This symbol is used when a reference is made to a member that is defined in a virtual base class in order to get the virtual base class pointer that is needed to eventually reference the specified member. For example, the code generated for Code Example 21 is as follows:

```
lw    r1,   40 (sp)
lw    r2,   0 (r1)    /* load virtual base pointer for alpha */
li    r3,   10
sw    r3,   0 (r2)    /* store into member a2 */
Code Example 22
```

During relocation, the linker 112 uses the value of the virtual base class pointer member offset symbol for a2 in gamma to replace the 0 in the second instruction. Also, the value of the member offset symbol for a2 in gamma is used to replace the 0 in the fourth assembly instruction.

LEFT BIT-FIELD SHIFT, RIGHT BIT-FIELD SHIFT, INVERSE BIT-FIELD SHIFT, BIT-FIELD MASK, IN-PLACE BIT-FIELD MASK SYMBOLS

The left bit-field shift, right bit-field shift, inverse bit-field shift, bit-field mask, and in-place bit-field mask symbols are used in conjunction with the member offset and virtual base class pointer member offset symbols to read and write bit fields. These symbol types are relatively specific to the machine architecture of the target machine. These symbol types are appropriate for machine architectures (such as MIPS) that support the accessing of bit fields via a series of shifts and masks. These shifts and masks are done after the containing field has been loaded into a register.

The entries in the class symbol table 408 for these symbols each includes a member name and an optional secondary class pointer. The value of the left bit-field shift is the number of bits that the containing value needs to be shifted to the left in order to eliminate the unneeded high order bits.

The value of the right bit-field shift symbol is the number of bits that the containing value needs to be shifted to the right in order to move the value from its bit-field location to the low-order bits in a register. The value of the inverse bit-field shift symbol is the number of bits that the left-shifted value must be right shifted in order to move the left-shifted value to the low-order bits in-a register. The value of the bit-field mask symbol is equal to $2^n-1$, where n is the size of the bit-field. It is used to mask out the bits that are to be stored into bit-field. The value of the in-place bit-field mask symbol contains ones everywhere expect for the actual bits in the bit-field.

Consider the following example class definition:

```
class alpha {
    public:
        int a : 3;
        int b : 20;
        int c : 9;
};
alpha *pa;
Code Example 23
```

Table 1 presents the values of the symbols associated with the above class definition:

TABLE 1

| Bit-Field Symbol Values | | | |
| --- | --- | --- | --- |
| | pa->a | pa->b | pa->c |
| left bit-field shift | 0 | 3 | 23 |
| right bit-field shift | 29 | 9 | 0 |
| inverse bit-field shift | 29 | 12 | 23 |
| bit-field mask | 0x3 | 0xfffff | 0x1ff |
| in-place bit-field mask | 0x30000000 | 0xe00001ff | 0xfffffe00 |

Now consider the following code example:

```
alpha *pa;
int i;
int j;
i = pa->b;
pa->b = j;
Code Example 24
```

Given the class definition in Code Example 23, the code in Code Example 24 would be compiled to yield the following code:

```
lw    r1,   40(sp)     /* load pa */
lw    r2,   0(r1)      /* load word holding pa->b */
sll   r2,   r2, 0      /* strip high-order bits */
sra   r2,   r2, 0      /* strip low-order bits */
sw    r1,   44(sp)     /* store i */
lw    r1,   40(sp)     /* load pa */
lw    r2,   0(r1)      /* load word holding pa->b */
lw    r3,   48(sp)     /*load j */
srl   r4,   r2, 0      /* pa->b in low order bits */
xor   r4,   r4, r3     /* xor in j */
sll   r4,   r4, 0      /* clear high order bits */
srl   r4,   r4, 0      /* move value into place */
xor   r4,   r4, r2     /* xor to remove original value of pa->b */
sw    r4,   0(r1)      /* store back word holding pa->b */
Code Example 25
```

The linker 112 would perform the following relocations:

Replace the 0 in the second, seventh, and fourteenth instructions with the value of the member offset symbol for the member b in the class alpha.

Replace the 0 in the third and twelfth instructions with the value of the left bit-field shift symbol for the member b in the class alpha.

Replace the 0 in the fourth and eleventh instructions with the value of the inverse bit-field shift symbol for the member b in the class alpha.

Replace the 0 in the ninth instruction with the value of the right bit-field shift symbol for the member b in the class alpha.

STATIC DATA MEMBER REFERENCE SYMBOL

The static data member reference symbol is used to obtain the address of a static data member associated with the reference class. An entry in the class symbol table 408 for a static data member reference symbol includes the name of the data member. If a qualifying class is used in the code, that class becomes the reference class. Preferably, the value of the static data member reference symbol is the index into the global offset table (GOT) that will contain the address of the static member. Consider Code Examples 26 and 27.

```
class alpha {
   public:
      static long sa;
};
alpha::sa = 30;
Code Example 26
li r1, 30
sw r1, 0 (gp)
Code Example 27
```

The code in Code Example 27 results from compiling Code Example 26. In Code Example 27, the linker 112 during relocation replaces the second instruction by the value of the static data member reference symbol for the member sa in the class alpha. If the present invention is extended to also handle non-shared code, then the value associated with this symbol would be the address itself.

NON-VIRTUAL MEMBER FUNCTION REFERENCE SYMBOL

The non-virtual member function reference symbol is used for accessing any non-virtual member function, static member function or qualified virtual member function. An entry in the class symbol table 408 for a non-virtual member function reference symbol includes the name of the member function. This name is mangled to include the parameter types but not the defining class. The entry may optionally include an indication of a qualifying class for a non-virtual member function, and must include such an indication for a qualified virtual member function. Such an indication is not included for a static member function.

This symbol is used to get the address of the function in question. As with the static data member reference the value of this symbol is preferably the index of the GOT entry used to hold the actual address of the function.

NON-VIRTUAL MEMBER FUNCTION "THIS" POINTER OFFSET SYMBOL AND THE NON-VIRTUAL BASE CLASS POINTER MEMBER FUNCTION OFFSET SYMBOL

The non-virtual member function "this" pointer offset symbol and the non-virtual base class pointer member function offset symbol are used in adjusting the "this" pointer when calling a non-virtual member function or a qualified virtual member function. The entries in the class symbol table 408 for these symbols include the name of the member function and, if necessary, a qualified class. If the member function is defined in a virtual base class then the value of the non-virtual base class pointer member function offset symbol is the offset to the virtual base class pointer for the defining class and the value of the non-virtual member function "this" pointer offset symbol is the offset within the virtual base class to the actual defining class. If the member function is not from a virtual base class then the value of the non-virtual member function "this" pointer offset symbol is the offset from the start of the instance to the defining class portion of the instance. That value will be zero unless the defining class is a non-leftmost base class.

The following code makes a variety of member function calls that are relocated using the above symbols:

```
class alpha {
   public:
      int a;
      int A ();
      virtual int VA();
};
class beta {
   public:
      int b;
      int B();
};
class delta {
   public:
      int D();
};
class gamma : public alpha, public beta,
              public virtual delta {
   public:
      int G();
};
gamma *pg;
pg->A();
pg->alpha:: VA();
pg->B();
pg->D();
Code Example 28
```

The assembly code for the first member function call in Code Example 28, pg—>A(), is as follows:

```
lw      t9, 0(gp)     /* load address of alpha::A */
lw      a0, 40(sp)    /* load pg as argument */
jalr    ra, t9        /* call alpha::A */
nop
Code Example 29
``` where the 0 in the first instruction is replaced by the linker 112 by the value of the non-virtual member function reference symbol for the member A() in the class gamma. Note that no instruction sequence is generated to adjust the "this" pointer, in preparation for multiple inheritance. That instruction is not needed since, in one embodiment, member functions are not allowed to be promoted into non-leftmost base classes. The assembly code for the qualified member function call, pg—>alpha::VA(), is identical to the above sequence with the 0 in the first instruction being replaced by the value of the non-virtual function reference symbol for the member VA(), qualified by the class alpha in the class gamma.

The assembly code for the member function call pb—>B() is as follows:

```
lw      t9, 0(gp)     /* load address of alpha::B */
lw      a0, 40(sp)    /* load pg as argument */
jalr    ra, t9        /* call alpha::B */
addiu   a0, a0, 0     /* Add in base class offset */
Code Example 30
``` where the 0 in the first instruction is replaced by the linker 112 by the value of the non-virtual member function reference symbol for the member B() in the class gamma and the () in the last instruction is replaced by the value of the non-virtual member function "this" pointer offset symbol for the member B() in the class gamma.

The assembly code for the member function call pb—>D() is as follows:

```
lw      r1, 40(sp)    /* load pg */
lw      t9, 0(gp)     /* load address of alpha::D */
lw      a0, 0(r1)     /* follow base class ptr */
nop
jalr    ra, t9        /* call alpha::A */
addiu   a0, a0, 0     /* Add in base class offset */
Code Example 31
``` where the 0 in the second instruction is replaced by the linker 112 by the value of the non-virtual member function reference symbol for the member D() in the class gamma, the 0 in the third instruction is replaced by the non-virtual base class pointer member function offset symbol for the member D() in gamma, and the 0 in the last instruction is replaced by the value of the non-virtual member function "this" pointer offset symbol for the member D() in the class gamma.

VIRTUAL BASE CLASS POINTER FUNCTION OFFSET, VIRTUAL MEMBER FUNCTION TABLE FUNCTION OFFSET, AND VIRTUAL MEMBER FUNCTION TABLE "THIS" OFFSET SYMBOLS

The virtual base class pointer function offset, virtual member function table function offset, and virtual member function table "this" offset symbols are used to access virtual member functions. The entries in the class symbol table 408 for these symbols each includes the name of the member function. There is no qualifying class. The virtual base class pointer function offset symbol is used when the virtual member function is defined in a virtual base class and its value is the offset to the virtual base class pointer for that base class. The value virtual member function table function offset symbol is the number of bytes to be added to the address of the virtual table associated with the instance in order to retrieve the address of the function to call. The value of the virtual member function table "this" offset symbol is the number of bytes to add to the address of the virtual table in order to retrieve the offset that should be added to the "this" pointer when making the virtual member function call.

Using the class definitions given in Code Example 28, the assembly code for the virtual member call pg—>VA() is as follows:

```
lw      a0, 40(sp)    /* load pg */
nop
lw      r1, 0(a0)     /* load viable ptr */
nop
lw      r2, 0(r1)     /* load this offset */
lw      t9, 0(r1)     /* load function pointer */
addu    a0, a0, r2    /* adjust this pointer */
jalr    ra, t9        /* call function */
nop
Code Example 32
```

In Code Example 32, the 0 in the third instruction is replace by the linker 112 with the value of the virtual table pointer offset symbol for the class gamma, the 0 in the fifth instruction is replaced with the value of the virtual member function table "this" offset symbol for the member VA() in the class gamma and the 0 in the sixth instruction is replaced by the value of the virtual member function table function offset symbol for the member VA() in the class gamma.

POINTER-TO-MEMBER-FUNCTIONOFFSET, POINTER-TO-MEMBER-FUNCTIONINDEX, POINTER-TO-MEMBER-FUNCTION VALUE SYMBOLS

The pointer-to-member-function offset, pointer-to-member-function index, pointer-to-member-function value symbols are used for initializing the value associated with a pointer to member function. Entries in the class symbol table 408 for these symbols contain the name of the member function and an optional qualifying class. A pointer to member function contains three fields: the function field, the index field and the value field. If the pointer to member function contains a reference to a virtual member function, then the function field contains the offset to the virtual table pointer within the instance, the index field contains the index into the virtual table for the member function in question and the value field contains the offset to add to the "this" pointer when making the function call. If the pointer to member function references a non-virtual member function then the function field contains the address of the function to call, the index field is −1 and the value field is again the offset to add to the "this" pointer when making the function call.

The use of these symbols can be seen by examining the initialized data associated with the following code.

```
int (gamma::*f) () = &gamma::VA;
int (gamma:: *g) () = &gamma::A;
Code Example 33
```

In Code Example 33, the definition for gamma is given in Code Example 28, Each of these definitions creates a 2 word structure. The first 16 bits of the structure for the variable f will be filled in by the linker 112 by the value of the pointer-to-member-function offset symbol for the member VA() in the class gamma, the second 16 bits will be filled in by the value of the pointer-to-member-function index symbol for the member VA() in the class gamma, and the second word of the structure will be filled in with the value of the pointer-to-member-function value symbol for the member VA in the class gamma. The structure for the variable g will be filled in with values from the same symbol types except that the symbols will reference the member A in the class gamma. The difference between these two structures will be the values associated with the symbols. Given the current definition of gamma, the variable f will be filled in with the values 0, 1, and 4 for the three symbols. The variable g will be filled in with the values 0, −1, and the address of alpha::A.

POINTER-TO-DATA-MEMBER OFFSET SYMBOL

The pointer-to-data-member offset symbol is used for initializing pointer-to-data-members. Entries in the class symbol table 408 for this symbol each contains the name of the data member and an optional qualifying class. Preferably, a pointer to data member is set to the offset of the member within the reference class instance plus 1. The addition of 1 allows for 0 to represent the NULL pointer-to-data-member. The value of the pointer-to-data-member offset symbol is that value. Consider the following code (again with reference to the class definitions in Code Example 28):

*int gamma::*m=&gamma::b;*

The above statement causes the generation of a single word structure which is filled in by the linker 112 with the value of the pointer-to-data-member offset symbol for the member b in the class gamma. In this case that value would be 9.

BEGIN AUTOMATIC INSTANCE BLOCK, AUTOMATIC CLASS INSTANCE, AND END AUTOMATIC INSTANCE BLOCK SYMBOLS

The begin automatic instance block, automatic class instance, and end automatic instance block symbols are used to handle automatic class instances. Two problems must be addressed when a class is allocated on the stack. First, the stack pointer must be adjusted to leave room for the class instances. Since the size of the instance is not known until link time, the adjustment must be made through relocations. The value of the end automatic instance block symbol is used to perform that adjustment. The second problem is the calculation of the address of the object that has been allocated on the stack. Preferably, to reference an automatic class instance, an offset from a frame pointer is used that is set during the prologue code of any function that contains an automatic class instance. The value of the automatic class instance symbol is that offset. The automatic class instance contains a pointer into the class instance table, which gives the type of the instance and the number of elements that are to be allocated.

The begin-automatic instance block, automatic class instance, and end automatic instance block symbols for a single function are grouped together. This is necessary in order to calculate the values associated with the automatic class instance, end automatic instance block symbols. The values of the begin-automatic instance block symbols are selected by the compiler to be the minimum space that is needed between the stack pointer and the automatic instances being generated. This is typically the space needed on the stack for calling other functions. In calculating the position of the automatic class instances, a running total is used of the space allocate so far. At the start of the layout of the automatic instances that value is set to 0. Then, for each automatic class instance symbol, the size of that instance is calculated which is then added to that running total. That value is used as the value of the associated class instance symbol. That value is the offset from the block frame pointer that is used to access the instance in question. Finally, when all those symbols have been evaluated, the running total is added to the value of begin automatic instance block symbol, which is then used as the value associated with the end automatic instance block symbol. This is the value that is added to the frame pointer in order to set the new stack pointer.

Consider the following code:

```
class alpha {
  public:
    int i;
    int j;
    int A();
    alpha();
};
int test()
{
  alpha la1[20];
  alpha la2;
  return la1[10].i + la2.j;
}
Code Example 34
```

The code in Code Example 34 causes four symbols to be created. A begin automatic instance block symbol is generated first which in this case would have a value of 16. This is followed by two automatic class instance symbols, one for la1 and one for la2. The symbol for la1 would reference a class instance entry that would state that 20 elements of the class alpha are needed. The symbol for la2 would reference another class instance entry that would state that 1 element of class alpha is needed. Finally, there is an end automatic instance block symbol. With the above definition of alpha the values of those last three symbols would be 160, 168 and 184. References to those variables require calculating the address of the variables relative to the stack pointer. So, for example the reference to la2.j results in the generation of the following assembly code:

```
lui       r1, 0
addiu     r1, r1, 0
subu      r2, fp, r1
lw        r3, 0(r2)
Code Example 35
```

In Code Example 35, the first two instructions are modified by the linker 112 by the value of the automatic class instance symbol for la2. The high-order bits of that value plus 0×8000 replace the 0 in the first instruction and the low-order bits of that value replace the 0 in the second instruction. The 0 in the fourth instruction is replaced with the member offset symbol for the data member j in the class alpha.

The prologue and epilogue code for this function are also modified in order to set the new stack pointer given that the frame pointer has already been set. The prologue instruction sequence includes the following assembly code:

```
lui       r1, 0
addiu     r1, r1, 0
move      fp, sp
subu      sp, sp, r1
Code Example 36
```

In Code Example 36, the first two instructions are modified by the linker 112 by the value of the end class instance block symbol.

3.6 Class Relocation Table

The class relocation table 412 contains a list of the relocations which must be performed by the linker 112 during link-time. An example class relocation table 4 12 is shown in FIG. 7. Each entry in the class relocation table 412 includes a relocation type, an address of either an instruction or a data element that needs to be relocated, and, in all but one case, a pointer to an entry in the class symbol table 408.

As described below, the linker 112 calculates the values of the symbols in the class symbol table 408 before processing the relocation entries in the class relocation table 412. In processing each relocation entry, the value is extracted from the class symbol table and is store at the given address according to the type of the relocation entry.

Consider the example scenario shown in FIG. 7. This scenario corresponds to the code in Code Example 15. Prior to processing the relocation entries 702, 706, 710 in the class relocation table 412, the linker 112 evaluates the symbol entries 714, 718 in the class symbol table 408. Symbol entry 714 essentially corresponds to the question, "What is the size of class alpha?" (note that pointer 716 in this symbol entry 714 points to an entry 722 in the class reference table 410 associated with class alpha). As discussed above, for the current example, the size of class alpha is 24 bytes. Accordingly, the linker 112 inserts this value (24 bytes) into the value field of the symbol entry 714.

Symbol entry 718 essentially corresponds to the question, "What is the alignment of class alpha?" (again, note that pointer 720 in this symbol entry 718 points to an entry 722 in the class reference table 410 associated with class alpha). As discussed above, for the current example, the alignment of class alpha is 8 bytes. Accordingly, the linker 112 inserts this value (8 bytes) into the value field of the symbol entry 718.

While processing relocation entry 702, the linker 112 replaces the 0 (which is used as a placeholder in the present invention) in the instruction at address A1 (which in this example corresponds to the first instruction in Code Example 15) with the value in symbol entry 714 (i.e., 24 bytes). This is the case, since pointer 704 in relocation entry 702 points to symbol entry 714. Similarly, while processing relocation entry 706, the linker 112 replaces the 0 in the instruction at address A6 (which in this example corresponds to the sixth instruction in Code Example 15) with the value in symbol entry 714 (i.e., 24 bytes). While processing relocation entry 710, the linker 112 replaces the 0 in the instruction at address A3 (which in this example corresponds to the third instruction in Code Example 15) with the value in symbol entry 718 (i.e., 8 bytes).

The types of relocation entries used by the present invention are preferably as follows. It should be noted, however, that such relocation entries are implementation dependent, particularly on machine architecture.

1. 16 bit data relocation—take the low order 16 bits of the symbol value and store it in the 16 bit location given by the address.
2. 32 bit data relocation—take the low-order 32 bits of the symbol value and store it in the 32 bit location given by the address.
3. 16 bit instruction relocation—take the low order 16 bits of the symbol value and store it in the low order 16 bits of the instruction given by the address.
4. 16 bit high address relocation—take the high order 16 bits of the symbol value, plus 0x8000 and store it in the low order 16 bits of the instruction given by the address.
5. 5 bit shift relocation—take the low order 5 bits of the symbol value and store it in the low order 5 bits of the instruction given by the address.
6. 16 bit add immediate relocation—interpret the symbol pointer as an integer which is then added to the low order 16 bytes of the instruction given by the address. This relocation is used to provide long long support.

4. Operation of the Compiler

The compiler 104 is further described in this section.

The compiler 104 generates code that is relocated at link-time once all the actual class definitions are known. If a dynamic class is referenced in a source file, the compiler 104 generates both a class symbol table 408 and a class relocation table 412. If there are any class instances, the compiler 104 also generates a class instance table 416. The contents of the class definition table 414 depend on several conditions. First, the compiler 104 produces a class definition for a dynamic class if the source file being compiled contains the definition of the first virtual member function associated with that class. If the class does not have any virtual member functions then a class definition is produced if the source file contains the definition of the first non-inline member function. The compiler 104 produces a class definition of any internal dynamic class that is referenced in the source file. These definitions are marked as being internal dynamic which tells the linker 112 that it will find multiple definitions and that it is free to pick any one of them. Finally, the compiler 104 produces class definitions for any non-dynamic classes that are ancestors of any other class whose definitions are being generated. Again, the linker 112 should expect to find multiple declarations of non-dynamic classes and is free to choose any one of them.

There are instances where the compiler 104 produces different code for dynamic classes than for non-dynamic classes. First, there are a set of functions that if they exist, must be dropped out of line. The functions are the default constructor, the copy constructor, the destructor and the assignment operator. If the class is defined so that any of these functions could be generated by the compiler 104, then they must be generated by the compiler 104 and dropped in the same object file as the class definition. For internal dynamic classes, these functions need only be generated when they are actually used but are marked in a way to tell the linker 112 that it will again find multiple definitions and can pick one of them. The reason that these functions must be generated is that it is impossible to determine when they will be needed and they cannot be generated in the file that actually references them. The definition of these functions depends on the actual definition of the object. If the class definition changes then these functions must change as well. This requires that any file that contains those function definitions must be recompiled if the class definition changes. By dropping those functions in the object file that contains the class definition, then they will be recompiled together. The necessity to recompile these functions when the class definition changes is also the reason why these functions can not be inlined. If they were inlined then they would appear through out the object files and this would gain force the recompilation of any file that had one of these inlined functions.

5. Operation of the Linker

Figure 6:
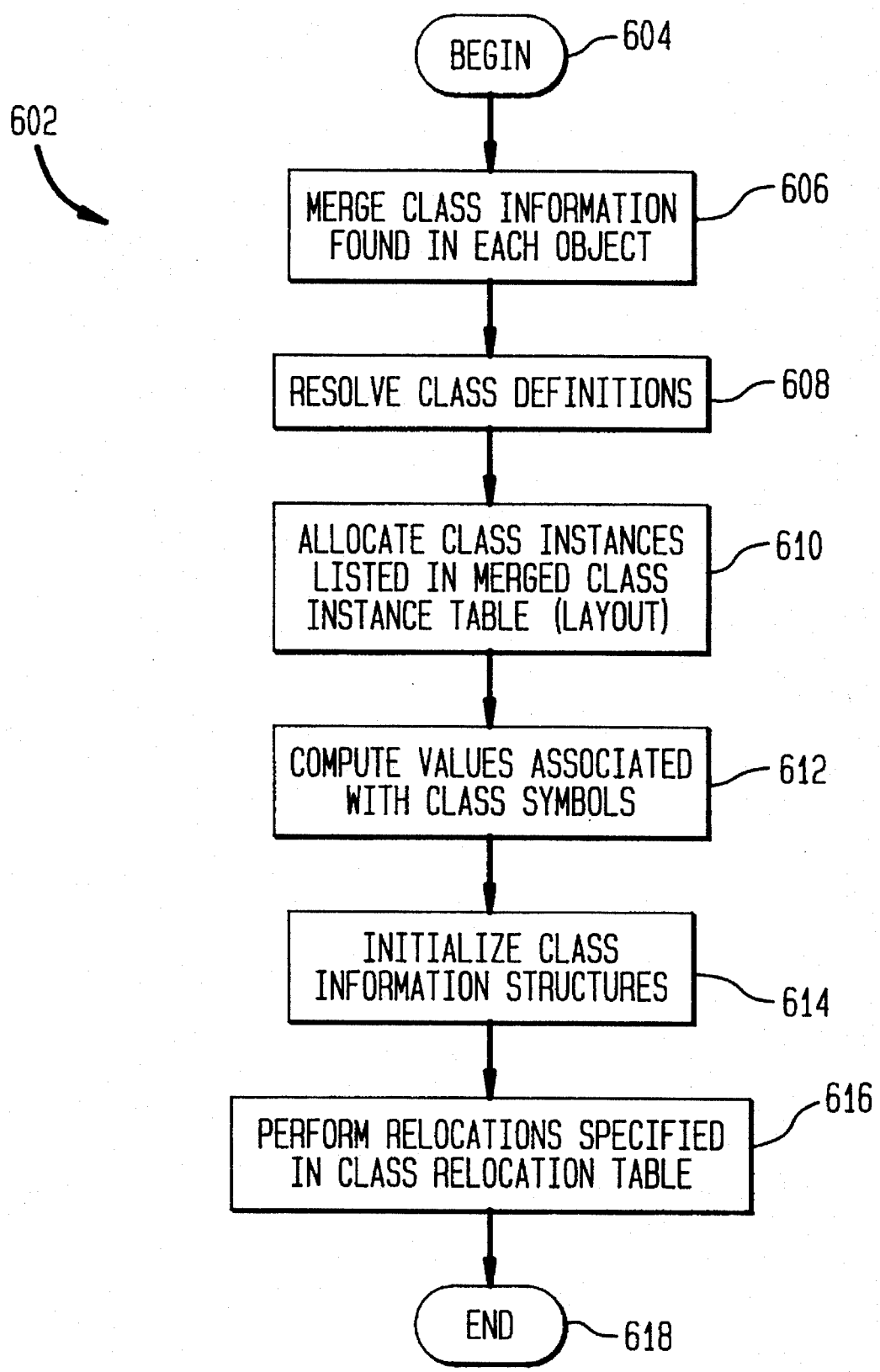
FIG. 6 is a more detailed flowchart of a linking process according to a preferred embodiment of the present invention.

As discussed above, the operation of the linker 112 may be broken down into four phases: a read phase 306, a layout phase 308, a relocation phase 310, and a write phase 312 (FIG. 3). In the present invention, these linker phases 306, 308, 310, and 312 have been modified such that the linker 112 resolves class definitions. Such modification are shown in a flowchart 602 in FIG. 6. In particular, step 606 is preferably performed during the read phase 306. Step 608 is preferably performed between the read phase 306 and the layout phase 308. Step 610 is preferably performed during the layout phase 308. Steps 612 and 614 are preferably performed between the layout phase 308 and the relocation phase 310. Step 616 is preferably performed during the relocation phase 310.

Flowchart 602 shall now be described. Flowchart 602 begins with step 604, where control immediately passes to step 606.

In step 606, the linker 112 reads in the object files 106, 108 and the shared libraries 110 and merges together the class information 406 contained in these files. In particular, the linker 112 merges together the class symbol tables 408 contained in these files to generate a merged class symbol table. Similarly, the linker 112 merges together the class relocation tables 4 12, class instance tables 416, class reference tables 410, class definition tables 414, and class information variable tables 418 to generate a merged class relocation table, a merged class instance table, a merged class reference table, a merged class definition table, and a merged class information variable table.

Two issues that must be addressed when doing this merge operation are what to do about duplicate members and the mapping of references from the relocations to the merged class instance table and the merged class symbol table. When merging the class definition tables 414, duplicate non-dynamic and internal dynamic class definitions are removed. Duplicate definitions of dynamic classes are considered to be an error. When merging class instance tables 416, duplicate entries are considered to be an error. Duplicate entries in the class symbol tables 408 are removed. There are no duplicate entries in the class relocation tables 412.

As for updating the references from the relocation entries to the merged class instance table and the merged class symbol table, this is preferably handled in the same manner as the linker 112 handles conventional relocations and their reference to elements in the conventional symbol table 404 (such operation is well known).

In step 608, the linker 112 resolves class definitions. In particular, the linker 112 processes the merged tables (particularly the merged class definition table) and determines the layout of each class (for example, the size and alignment of each class, the number of fields, the data types of the fields, the number of bytes from the top of the class to each of the fields, etc.). The linker 112 creates a separate data structure for each class, and stores this class specific information in such data structures. These data structures are called "class layout data structures" for reference purposes. Upon the completion of step 608, the linker 112 is aware of all class-related information that are conventionally known by conventional compilers.

In step 610, the linker 112 allocates memory in the linked executable for the class instances as indicated by the merged class instance table, and for entries in the class information variable table 418. In particular, the linker 112 processes the entries in the merged class instance table, and allocates memory for class instances as dictated by such entries. Consider, for example, the example class instance table 416 in FIG. 8. In accordance with entry 804 in this class instance table 416, the linker 112 would allocate memory for one instance of class alpha (the size of each alpha instance is stored in the class layout data structure for class alpha).

In step 612, the linker 112 evaluates the symbols in the merged class symbol table. In particular, the linker 112 determines the value of the symbol in each entry of the merged class symbol table, and stores this value in the value field of this entry. Consider, for example, the example class symbol table 408 in FIG. 7. The linker 112 determines the values of entries 714 and 718 by referencing the appropriate class layout data structure for class alpha. The linker 112 stores these values (b 24bytes and 8 bytes, respectively) in the value fields of these entries 714, 718. The manner in which the linker 112 calculates the values of other symbol types is described above.

In step 614, the linker 112 initializes class information structures. In particular, during step 614 the linker 112 generates virtual tables and virtual table pointer information tables, and stores these tables in the appropriate data structures that were allocated in step 610.

The linker 112 performs these operations in accordance with the entries in the merged class information variable table. Consider the example class information variable table 418 in FIG. 8. The linker 112 processes each entry in the class information variable table 418. For the entry 810 in the class information variable table 418, for example, the linker 112 allocates memory for a data structure, and then stores the address of such memory in the appropriate field of the associated entry 818 in the symbol table 404. The linker 112 forms the virtual table and the virtual table pointer information table for the class alpha, and stores these tables in this data structure. The linker 112 forms the virtual tables and the virtual table pointer information tables in a well known manner based on information contained in the class layout data structures.

In step 616, the linker 112 performs the relocations specified in the entries of the merged class relocation table. The manner in which the linker 112 performs this function is described above.

After step 616 is fully performed, the operation of flowchart 602 is complete, as indicated by step 618.

As will be appreciated by persons skilled in the relevant art, the operation of the linker 112 described above is, in practice, collectively performed by the static linker 114 and the run-time linker 118. Whether the operations described above are performed by the static linker 114 or the run-time linker 118 is not important in the present invention.

Preferably, however, the static linker 114 attempts to prelink executables and shared objects so that if the executable and shared objects are in the same state as when they were created, then the run-time linker 118 needs to only load the files and start running. If the executable and objects are not in the same state, then the run-time linker 118 must redo many of the relocations done by the static linker 114.

It is possible for the static linker 114 to prelink the application if all of the class definitions for the classes referenced in the class definition tables 414, class instance tables 416, and class symbol tables 408 are available. A class definition can be made available to the static linker 114 by either being found in the class definition tables of the objects being linked or being found in a shared library that will become a dependent shared library of the object being linked. If any class definition is missing, then the run-time linker 118 will have to do the final link during execution.

In practice, the run-time linker 118 may have to redo many of the relocations that were done by the static linker 114. Included in this is the list of class-based relocations, the layout of the entries found in the class instance table and the initialization of the class information structures. When allocating class instances and class information structures, the run-time linker 118 preferably attempts to reuse the space allocated by the static linker 114 when it did its prelink. The space can be reused if the size of the instance or class information structure is no larger than the space already allocated for the same entry.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of compiling and linking a source file, comprising the steps of:

(1) generating, by a compiler, class information pertaining to object-oriented classes referenced in said source file, said class information being sufficient to enable a linker to resolve class definitions and to perform class relocation operations;

(2) generating, by said compiler, an object file from said source file, said object file comprising said class information, said object file being generated such that resolution of class definitions and performance of class relocation operations are delayed until operation of said linker; and (3) linking, by said linker, said object file with at least one of another object file and a shared library to thereby generate an executable file, step (3) comprising the step of using said class information contained in said object file to resolve class definitions and to perform class relocation operations.

2. The method of claim 1, wherein step (1) comprises the step of:

generating a class definition table comprising an entry for each dynamic class, internal dynamic class, and non-dynamic class referenced in said source file, each entry comprising a list of base classes, a list of data members, a list of static data members, a list of member functions, and a list of static member functions pertaining to an associated class.

3. The method of claim 2, wherein step (3) comprises the step of:

determining a layout of each class referenced in said source file based on information contained in said class definition table.

4. The method of claim 1, wherein step (1) comprises the step of:

generating a class instance table comprising an entry for each object instantiated and referenced in said source file.

5. The method of claim 4, wherein step (3) comprises the step of:

allocating memory for each object listed in said class instance table.

6. The method of claim 1, wherein step (1) comprises the step of:

generating a class symbol table comprising a class symbol entry for each applicable symbol associated with each class referenced in said source file, each class symbol entry including a symbol type field comprising information identifying a symbol type, a class field comprising information identifying an associated class, and a value field comprising a value of said symbol type for said associated class.

7. The method of claim 6, wherein step (3) comprises the steps of:

(a) selecting a class symbol entry from said class symbol table;

(b) determining a value of a symbol type of said selected class symbol entry for an associated class of said selected class symbol entry as identified by information contained in symbol type and class fields of said selected class symbol entry;

(c) storing said value in said value field of said selected class symbol entry; and (d) performing steps (a)–(c) for each class symbol entry in said class symbol table.

8. The method of claim 7, wherein step (1) further comprises the step of:

generating a class relocation table comprising a plurality of class relocation entries, each of said class relocation entries including a relocation type field comprising information identifying a relocation type, an address field comprising an address of one of an instruction and data in said object file requiring relocation, and a pointer to a particular class symbol entry in said class symbol table, said particular class symbol entry being of an appropriate symbol type and an appropriate class as indicated by information contained in symbol type and class fields of said particular class symbol entry.

9. The method of claim 8, wherein step (3) further comprises the step of:

performing class relocation operations as dictated by said class relocation entries in said class relocation table.

10. The method of claim 1, wherein said executable file comprises a shared library.

11. A system of compiling and linking a source file, comprising:

a compiler, comprising
class information generating means for generating class information pertaining to object-oriented classes referenced in said source file, said class information being sufficient to enable resolution of class definitions and performance of class relocation operations during link-time, and object file generating means for generating an object file from said source file, said object file comprising said class information, said object file being generated such that resolution of class definitions and performance of class relocation operations are delayed until link-time;

a linker for linking said object file with at least one of another object file and a shared library to thereby generate an executable file, said linker comprising means for using said class information contained in said object file to resolve class definitions and to perform class relocation operations.

12. The system of claim 11, wherein said class information generating means comprises:

means for generating a class definition table comprising an entry for each dynamic class, internal dynamic class, and non-dynamic class referenced in said source file, each entry comprising a list of base classes, a list of data members, a list of static data members, a list of member functions, and a list of static member functions pertaining to an associated class.

13. The system of claim 12, wherein said linker comprises:

means for determining a layout of each class referenced in said source file based on information contained in said class definition table.

14. The system of claim 11, wherein said class information generating means comprises:

means for generating a class instance table comprising an entry for each object instantiated and referenced in said source file.

15. The system of claim 14, wherein said linker comprises:

means for allocating memory for each object listed in said class instance table.

16. The system of claim 11, wherein said class information generating means comprises:

means for generating a class symbol table comprising a class symbol entry for each applicable symbol associated with each class referenced in said source file, each class symbol entry including a symbol type field comprising information identifying a symbol type, a class field comprising information identifying an associated class, and a value field comprising a value of said symbol type for said associated class.

17. The system of claim 16, wherein said linker comprises:

means for selecting a class symbol entry from said class symbol table;

means for determining a value of a symbol type of said selected class symbol entry for an associated class of said selected class symbol entry as identified by information contained in symbol type and class fields of said selected class symbol entry; and means for storing said value in said value field of said selected class symbol entry.

18. The system of claim 17, wherein said class information generating means comprises:

means for generating a class relocation table comprising a plurality of class relocation entries, each of said class relocation entries including a relocation type field comprising information identifying a relocation type, an address field comprising an address of one of an instruction and data in said object file requiring relocation, and a pointer to a particular class symbol entry in said class symbol table, said particular class symbol entry being of an appropriate symbol type and an appropriate class as indicated by information contained in symbol type and class fields of said particular class symbol entry.

19. The system of claim 18, wherein said linker comprises:

means for performing class relocation operations as dictated by said class relocation entries in said class relocation table.

20. The system of claim 11, wherein said executable file comprises a shared library.

21. A computer program product comprising a computer readable medium having computer program logic recorded thereon for enabling a computer system to compile and link a source file, said computer program product comprising:

class information generating means for enabling said computer system to generate, during compile-time, class information pertaining to object-oriented classes referenced in said source file, said class information being sufficient to enable resolution of class definitions and performance of class relocation operations during link-time;

object file generating means for enabling said computer system to generate, during compile-time, an object file from said source file, said object file comprising said class information, said object file being generated such that resolution of class definitions and performance of class relocation operations are delayed until link-time; and linking means for enabling said computer system to link, during link-time, said object file with at least one of another object file and a shared library to thereby generate an executable file, said linking means comprising means for using said class information contained in said object file to resolve class definitions and to perform class relocation operations.

22. A computer system, comprising:

a processor; and a controller for enabling said processor to compile and link a source file, said controller comprising:

class information generating means for enabling said processor to generate, during compile-time, class information pertaining to object-oriented classes referenced in said source file, said class information being sufficient to enable resolution of class definitions and performance of class relocation operations during link-time;

object file generating means for enabling said processor to generate, during compile-time, an object file from said source file, said object file comprising said class information, said object file being generated such that resolution of class definitions and performance of class relocation operations are delayed until link-time; and linking means for enabling said processor to link, during link-time, said object file with at least one of another object file and a shared library to thereby generate an executable file, said linking means comprising means for using said class information contained in said object file to resolve class definitions and to perform class relocation operations.

23. A controller for enabling a processor to compile and link a source file, said controller comprising:

class information generating means for enabling said processor to generate, during compile-time, class information pertaining to object-oriented classes referenced in said source file, said class information being sufficient to enable resolution of class definitions and performance of class relocation operations during link-time;

object file generating means for enabling said processor to generate, during compile-time, an object file from said source file, said object file comprising said class information, said object file being generated such that resolution of class definitions and performance of class relocation operations are delayed until link-time; and linking means for enabling said processor to link, during link-time, said object file with at least one of another object file and a shared library to thereby generate an executable file, said linking means comprising means for using said class information contained in said object file to resolve class definitions and to perform class relocation operations.

* * * * *